United States Patent Office 3,219,507
Patented Nov. 23, 1965

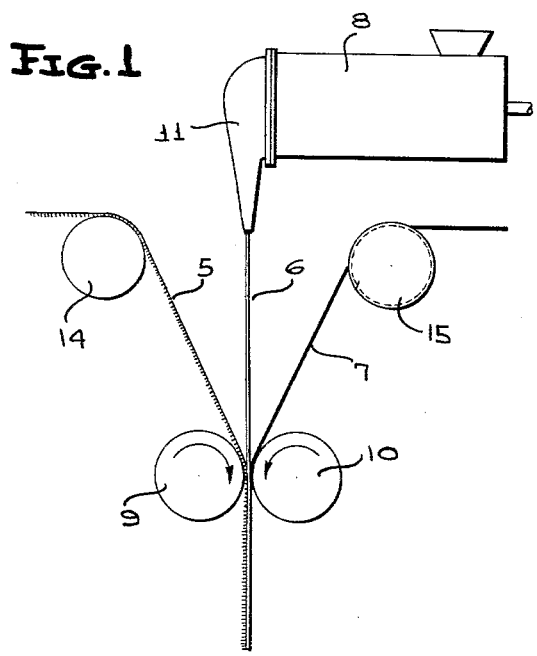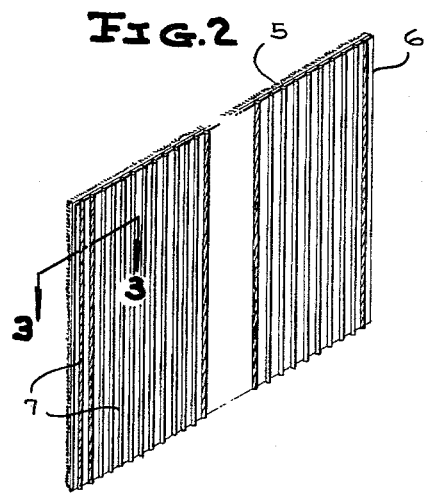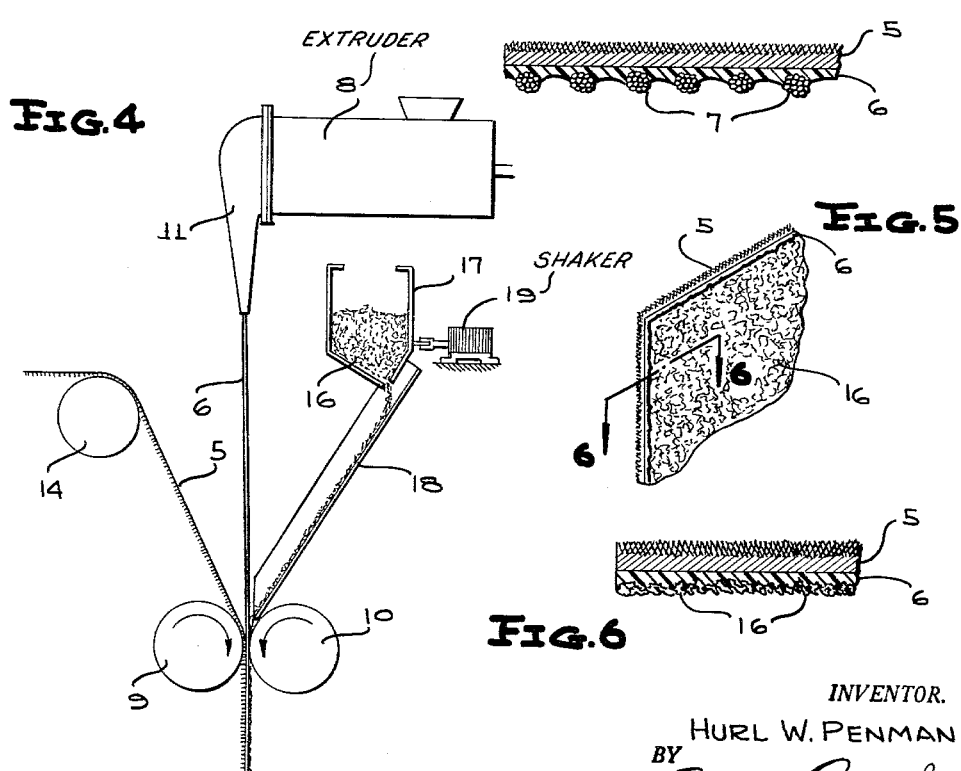

3,219,507
METHOD OF APPLYING PLASTIC SHEET TO PILE FABRIC BACKING
Hurl W. Penman, Bloomsburg, Pa., assignor to The Magee Carpet Company, Bloomsburg, Pa., a corporation of Pennsylvania
Filed Feb. 20, 1961, Ser. No. 90,254
2 Claims. (Cl. 156—244)

This invention relates to laminated fabrics such as carpets having a plastic backing and the method of applying the plastic coating to the backing of the fabric.

In my prior application Serial No. 57,291 filed September 20, 1960, now U.S. Patent 3,150,024 a method is disclosed wherein a thermoplastic powder is distributed on the backing of carpet and is then heated to form a soft plastic layer on which a sheet of scrim is applied. It is an object of the present invention to provide a plastic backing which will produce a textured finish and provide dimensional stability to prevent elongation or creeping of the fabric.

A further object of the invention resides in a method of coating the backing of carpet by extruding a sheet or film of viscous plastic under pressure and applying to the exposed surface of the plastic sheet, while still viscous, warps of jute or other suitable material which are pressed into the plastic sheet at the same time the plastic sheet is pressed into contact with the backing of the carpet.

A still further object of the invention resides in distributing flocks of jute or other material or granular material such as cork or rubber, onto the exposed surface of the plastic sheet and pressing the flocking or granular material into the plastic while pressing the plastic sheet onto the backing of the carpet.

Other objects and advantages of the invention will be apparent during the course of the following description.

In the accompanying drawings forming a part of this specification and in which like numerals are employed to designate like parts throughout the same, FIG. 1 is a schematic view of the apparatus for producing one form of the invention, FIG. 2 is a perspective view of a piece of fabric made by the apparatus shown in FIG. 1, FIG. 3 is a section taken on line 3—3 of FIG. 2, FIG. 4 is a schematic view of the apparatus for producing another form of the invention, FIG. 5 is a fragmentary perspective view of a piece of fabric made by the apparatus shown in FIG. 4, and FIG. 6 is a section taken on line 6—6 of FIG. 5.

In the drawings, FIGS. 2 and 3, show a pile fabric, such as carpet, constructed in accordance with one form of the invention. The pile fabric 5 is of conventional construction having tufts of yarn extending through a suitable backing. A plastic sheet 6 of suitable material such as polyethylene or other suitable thermoplastic material is applied to the backing of the carpet and partially embedded in the plastic sheet are a series of warps of jute 7 or other suitable material.

The method of making the fabric shown in FIGS. 2 and 3 is disclosed in FIG. 1 wherein an extruder 8 is disposed above a pair of pressure rolls 9 and 10 and has a discharge nozzle 11 for extruding a molten viscous sheet of thermoplastic 6, such as polyethylene, so that the sheet of plastic passes between the pressure rolls. The carpet 5 is trained over a guide roll 14 which directs the carpet downwardly in an inclined plane to pass between the pressure rolls with the backing of the carpet in contact with the plastic sheet. A warp beam 15 is disposed opposite guide roll 14 which directs a series of warp threads 7 of jute or other material downwardly between the pressure rolls in contact with the opposite surface of the plastic sheet so that the pressure rolls compress the carpet, plastic sheet and warps together thus firmly securing the plastic sheet to the backing of the carpet and partially embedding the warps in the plastic sheet. When the plastic sheet hardens the warps maintain the dimensional stability of the fabric and give the backing a textured appearance.

In FIGS. 5 and 6 a modified form of the invention is shown wherein the pile fabric 5 has a sheet of thermoplastic material 6 applied to the backing and partially embedded in the exposed surface of the plastic sheet are shreds of jute 16 or other suitable flocking material. In place of the flocking material granular material such as cork or rubber may be used.

The method of making the fabric shown in FIGS. 5 and 6 is disclosed in FIG. 4 wherein the extruder 8 is disposed above the pressure rolls 9 and 10 and has a discharge nozzle 11 for extruding a viscous sheet of plastic 6 to be applied to the backing of the carpet 5 as the carpet and plastic sheet pass between the pressure rolls. A hopper 17 for holding the flocking or granular material 16 is disposed above the upper end of a chute 18 leading down to the outer surface of the plastic sheet just above the pressure rolls. Suitable mechanism 19 for shaking the hopper discharges the flocking material onto the chute which conveys the same into contact with the outer surface of the plastic sheet so that when it passes between the pressure rolls the flocking material is partially embedded into the plastic sheet.

The extruder for the plastic material is of conventional construction and is provided with suitable heating means for reducing the plastic material to a viscous state and has pressure means for extruding the viscous plastic in a sheet of the desired thickness and width. The viscous sheet of plastic is applied to the backing of the carpet at the same time the warps or flocking material are applied to the exposed surface of the plastic sheet and the sheet of plastic is pressed into firm contact with the carpet backing to seal the tufts in the backing while the warps or flocking material is partially embedded in the exposed surface of the plastic sheet to give the sheet a textured appearance and maintain the dimensional stability of the fabric.

Having thus described my invention, I claim:

1. The method of applying a plastic sheet to the backing of a pile carpet which comprises the steps of extruding a molten viscous layer of plastic over the backing of the carpet, distributing pieces of resilient material to cover the exposed face of the layer of plastic and simultaneously compressing the backing, layer of plastic and pieces of material together to bind the layer of plastic to the backing and partially embed the pieces of material in the layer of plastic with portions of the pieces protruding from the exposed face of the layer.

2. The method of applying a sheet of plastic to the fabric backing of a carpet and partially embedding pieces of resilient material in the exposed surface of the plastic sheet which comprises the steps of extruding a continuous thin viscous sheet of polyethylene onto the backing of the carpet, said sheet being of a width corresponding to the width of the backing, simultaneously distributing pieces of resilient material over the exposed surface of the sheet of polyethylene while the sheet is still viscous and then passing the carpet, sheet of polyethylene and pieces of material between pressure rollers to bind the sheet to the carpet backing and partially embed the pieces of resilient material in the exposed surface of the sheet with portions of the pieces protruding from the exposed surface of the sheet.

(References on following page)

References Cited by the Examiner

UNITED STATES PATENTS

| | | | |
|---|---|---|---|
| 1,637,762 | 8/1927 | Campbell | 117—33 |
| 1,844,838 | 2/1932 | Buffington | 161—144 |
| 2,005,628 | 6/1935 | Schacht | 154—49 |
| 2,185,217 | 1/1940 | Moore | 117—33 |
| 2,512,727 | 6/1950 | Rice | 156—49.29 |
| 2,630,619 | 3/1953 | Schmidt et al. | 161—67 |
| 2,744,041 | 6/1955 | Balchen | 156—244 |
| 2,748,446 | 6/1956 | Mason | 28—74 |
| 2,752,277 | 6/1956 | Keen | 161—66 |
| 2,763,587 | 9/1956 | Masland | 154—49 |
| 2,910,762 | 11/1959 | Priester | 28—72 |
| 2,944,940 | 8/1961 | Ferrell et al. | 161—67 |
| 3,058,863 | 10/1962 | Gaines et al. | 161—95 |
| 3,075,867 | 1/1963 | Cochran | 156—72 |
| 3,148,076 | 9/1964 | Snyder | 117—21 |
| 3,179,550 | 4/1965 | Friedman | 156—244 X |

FOREIGN PATENTS

| | | |
|---|---|---|
| 220,509 | 2/1959 | Australia. |

ALEXANDER WYMAN, *Primary Examiner.*

CARL F. KRAFFT, EARL M. BERGERT, *Examiners.*

HERBERT L. GATEWOOD, ANTON J. SMEDEROVAC, HAROLD ANSHER, *Assistant Examiners.*